United States Patent [19]

McIntosh

[11] Patent Number: 4,862,478
[45] Date of Patent: Aug. 29, 1989

[54] SPREAD SPECTRUM COMMUNICATIONS WITH RESISTANCE TO MULTIPATH AT DIFFERENTIAL DELAYS BOTH LARGER AND SMALLER THAN A CHIP WIDTH

[75] Inventor: Stuckey McIntosh, Atlanta, Ga.

[73] Assignee: Gambatte, Inc., Atlanta, Ga.

[21] Appl. No.: 117,946

[22] Filed: Nov. 6, 1987

[51] Int. Cl.$^4$ ............................................. H04K 1/00
[52] U.S. Cl. ................................................... 375/1
[58] Field of Search .............................. 375/1; 380/34

[56] References Cited

U.S. PATENT DOCUMENTS

| | | | |
|---|---|---|---|
| 4,017,798 | 4/1977 | Gordy et al. | 375/1 |
| 4,071,692 | 1/1978 | Weir et al. | 375/1 |
| 4,231,113 | 10/1980 | Blasbalg | 375/1 |
| 4,279,018 | 7/1981 | Carson | 375/1 |
| 4,291,409 | 9/1981 | Weinberg et al. | 375/1 |
| 4,481,640 | 11/1984 | Chow et al. | 375/1 |
| 4,607,375 | 8/1986 | Lee | 375/1 |
| 4,641,322 | 2/1987 | Hasegawa | 375/1 |
| 4,647,863 | 3/1987 | Skudera, Jr. et al. | 329/112 |
| 4,665,404 | 5/1987 | Christy et al. | 375/1 |
| 4,672,605 | 6/1987 | Hustig et al. | 370/76 |
| 4,672,658 | 6/1987 | Kavehrad et al. | 379/63 |
| 4,730,340 | 3/1988 | Frazier, Jr. | 375/1 |

OTHER PUBLICATIONS

Scholtz, "The Origins of Spread-Spectrum Communications", IEEE Transactions on Communications, vol. COM-30, No. 5, May 1982, pp. 882-854.
Saleh et al, "Distributed Antennas for Indoor Radio Communications", IEEE, 1987.
Kavehrad et al, "An Experiment with Direct-Sequence Spread Spectrum Using Differential Phase Shift Keying Modulation", Proceedings of the IEEE Conference on Communications-87 (ICC-87), pp. 3.5.1-3.5.5.
Yoshida et al, "A Novel Anti-Multipath Modulation Technique DSK", Proceedings IEEE Globecom '85, pp. 36.4.1-36.4.5, New Orleans, Dec. 1985.
Yoshida et al, "Anti-Multipath Modulation Technique", Proceedings of ICC-87, pp. 39.3.1-39.3.5.

Primary Examiner—Salvatore Cangialosi
Attorney, Agent, or Firm—Pollock, Vande Sande & Priddy

[57] ABSTRACT

A spread spectrum communications system resistant to multipath due to differential delays equal to or less than a chip width. At the transmitter, a pseudonoise sequence is combined with data for transmission purposes and the result of that combining operation is then encoded. Manchester encoding or differential encoding are described. At the receiver, a differential demodulator is used with a delay of either a one-half chip width or a full chip width. In the receiver embodiment employing a one-half chip width delay, a notch filter is used at the output of the demodulator with a notch located at a frequency corresponding to the chip rate. The output of the notch filter is then input to a low pass filter. The output of the low pass filter is a base band signal which can be applied to a correlator to extract the original digital data. For the receiver embodiment which employs a full chip width delay, the output of the demodulator is applied to a low pass filter. The output of the low pass filter is then a base band signal which can be provided to a correlator for extracting the original digital data.

7 Claims, 3 Drawing Sheets

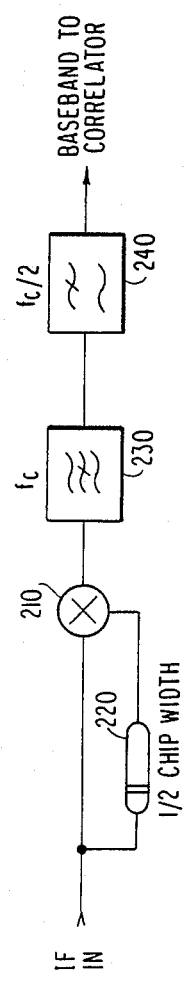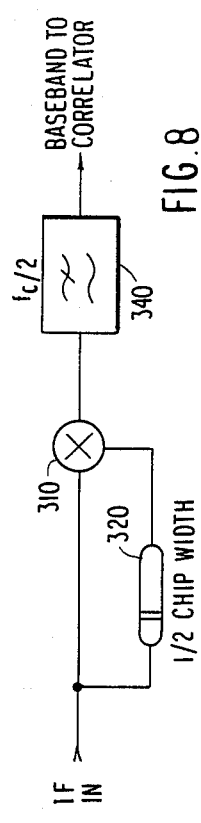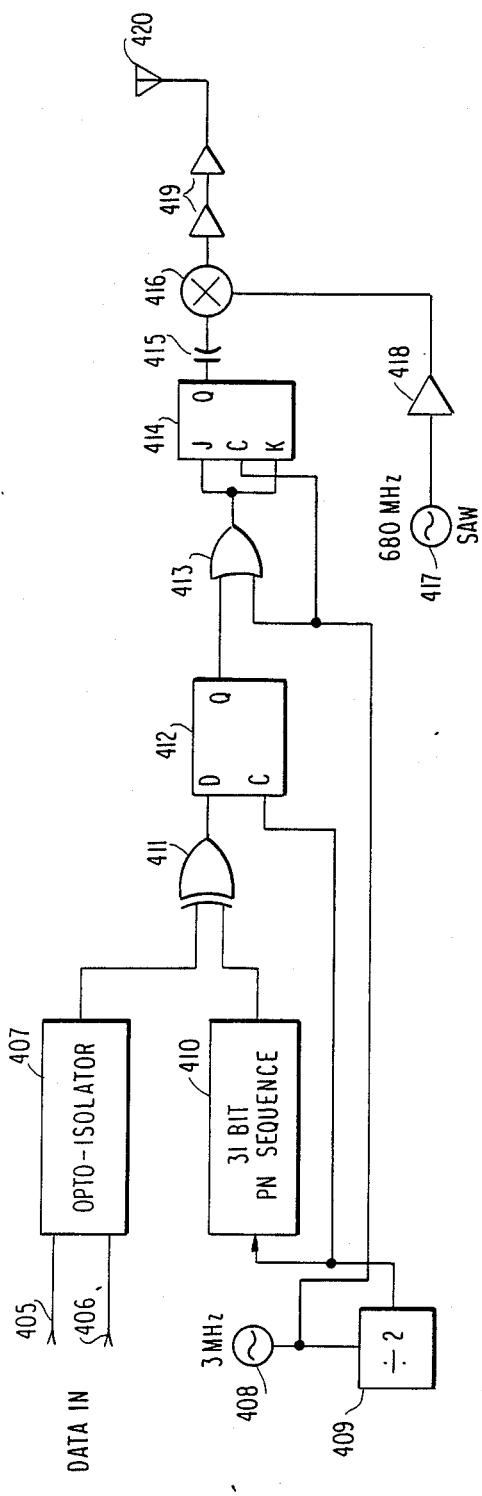

SPREAD SPECTRUM COMMUNICATIONS WITH RESISTANCE TO MULTIPATH AT DIFFERENTIAL DELAYS BOTH LARGER AND SMALLER THAN A CHIP WIDTH

DESCRIPTION

1. Technical Field

The invention relates to spread spectrum communications systems.

2. Background Art

The art has evolved a variety of digital transmission systems, all of which have different advantages and disadvantages. FIGS. 1 and 2 show schematically a prior art Binary Phase Sift Keyed (BPSK) transmitter and receiver (omitting IF/RF frequency converters and power amplifiers). FIGS. 3 and 4 show a Differentially Encoded BPSK (DE-BPSK) transmitter and receiver, respectively. Another prior art system is a Manchester Coded Phase Shift Keyed (MC-PSK). In Manchester coding each bit is transmitted as a sequence so that a data "0+ is transmitted by the sequence a-b and a data "1" is transmitted with the reverse sequence b-a, where a and b represent different values or symbols that the receiver can recognize. Manchester coding provides for a transition in the center of each bit time. Yoshida discloses that multipath resistance is property of a MC-PSK system which uses a differential detector. The systems mentioned above are digital communication systems, but not spread spectrum systems.

As indicated by Scholtz in "The Origins of Spread Spectrum Communications", *IEEE Transactions on Communications*, Vol. COM-30, No. 5, May 1982, the roots of spread spectrum communications go back into the 1920's. As he indicates that the basic signal characteristics of modern spread spectrum systems include:

(1) the carrier is an unpredictable, or pseudo-random, wideband signal,
(2) the bandwidth of the carrier is much wider than the bandwidth of the data modulation,
(3) reception is accomplished by cross-correlation of the received wideband signal with a synchronously generated replica of the wideband carrier.

In Scholtz's so called SR (stored reference) type system a pn (pseudo random) sequence (wherein each element of the pn sequence is referred to as a chip) is "multiplied" with the intelligence to be transmitted. It is the higher rate of the pn sequence which results in the wideband nature of the carrier. One of the advantages of spead spectrum is its ability to suppress the effects of multipath propagation. However, this multipath suppression is limited to differential delays on the order of the chip width or greater. Typically, spread spectrum advantage is achieved by "spreading" the spectrum of any intelligence to be transmitted outside the bandwidth that is minimally required for its transmission. There are a number of techniques which can be used to "spread" the intelligence to be transmitted, one of those techniques is the "multiplication" of the binary data to be transmitted by a chip sequence, usually a pseudo-random sequence (pn) which occurs at a rate $f_c$ which is referred to as the chip rate. Thus spread spectrum provides an advantage or suppression of multipath effects so long as the delay differential is greater than the chip width, see Cook, "An Introduction to Spread Spectrum" appearing in the *IEEE Communications Magazine*, Vol. 21, No. 2, Mar. 1983 at page 8 et seq.

However, one application in which differential delay can be extremely troublesome are applications involving indoor wireless communication. It should be apparent that such an application readily presents differential path delays in the sub-microsecond range. For example, a reasonable chip rate of 3 MHz corresponds to a chip width of 330 nanoseconds. Clearly, indoor applications can provide differential delays of less than this chip width. We could of course increase the chip rate, however, it has been reported by Saleh in "Distributed Antennas for Indoor Radio Communications" that differential path delays in the 50 nanosecond range typically occur in indoor applications. This would require an increase in the chip rate to above 20 MHz, raising cost and regulatory issues. Even then, differential delays less than 50 nanoseconds which do occur would still be a problem.

Kavehrad describes a Direct Sequence Spread Spectrum (DS/SS) system using differential phase shift keying modulation for indoor wireless communications. Kavehrad describes a direct sequence spread spectrum transmitter (DS/SS) which is also differentially endoced. At the receiver, a differential phase shift keyed demodulator (DPSK) is used with a delay corresponding to the data bit time (12.7 microseconds). A disadvantage of this system is the requirement for a Surface Acoustic Wave (SAW) device to perform a correlation function and a matched delay line. SAW devices are expensive, but even more disadvantageous is that each of the SAW devices is limited to a single data rate, chip rate and pn sequence and thus any changes to any of the data rate, chip rate or pn sequence requires a different SAW device.

It is therefore an object of the invention to provide a spread spectrum communication system wherein a data signal is spread by a pn sequence with a predetermined chip rate, which exhibits multipath suppression for differential delays below the chip width.

It is another object to provide such a system which exhibits relatively wide degrees of flexibility in selection of data rate, chip rate and pn sequence and at the same time is relatively insensitive (as compared to the prior art) of timing frequency errors.

SUMMARY OF THE INVENTION

In accordance with the invention a multipath resistant communication system includes a transmitter with a digital data input, a pn generator for generating a pn signal sequence at a first clock rate, means for logically combining, or exclusive ORing or multiplying the pn signal sequence with a signal available at the digital data input, an encoder with an imput and an output, the encoder input coupled to an output of the means for logically combining, a modulator with an oscillator input, a signal input and an output, the encoder output being coupled to the signal input of the modulator, an oscillator coupled to the oscillator input of the modulator and means for transmitting a signal produced at the output of the modulator. The receiver responds to the transmitted signal and includes an IF demodulator with a two-input mixer, one input fed with an IF signal and another fed by the IF signal delayed by a delay determined relative to the first clock rate, and a low pass filter with a cutoff frequency is about one-half the clock rate, an output of the low pass filter comprising a baseband signal corresponding to an output of the means for logically combining.

Two embodiments of the invention are described, one in which the encoder at the transmitter is a Manchester coder and another in which the encoder at the transmitter is a differential encoder.

Thus the invention provides:

a multi-path resistant spread spectrum communication system comprising:
a transmitter including:
a digital data input,
p-n generator means for generating a p-n signal sequence at a first clock rate,
means for logically combining said p-n signal sequence with a signal available at said digital data input,
an encoder with an input and an output, said encoder input coupled to an output of said means for logically combining,
a modulator with an oscillator input, a signal input and an output,
means coupling said encoder output to said signal input of said modulator,
an oscillator coupled to said oscillator input of said modulator,
means for transmitting a signal produced at said output of said modulator, and
a receiver responsive to said transmitted signal, said receiver including:
an IF demodulator with a two input mixer, one said input fed with an IF signal and another fed by said IF signal delayed by a delay determined relative to said first clock rate, and,
a low pass filter with a cutoff frequency at about one half said clock rate, an output of said low pass filter comprising a baseband signal corresponding to an output of said means for logically combining.

A receiver usable with either of the transmitter embodiments is a differential demodulator built around a one-chip delay. The output of the mixer, which is part of the demodulator, is coupled through a low pass filter whose cut off frequency is one-half the chip rate. An alternative demodulator, usable with the transmitter including Manchester encoding, uses a one-half chip delay as opposed to one chip delay and, in addition to the low pass filter, the output of the demodulator is first passed through a notch filter with a notch frequency at the chip rate.

In accordance with another aspect, the invention provides:

a spread spectrum differential demodulator for a Manchester coded direct sequence spread spectrum signal of chip rate $f_c$, said receiver comprising:
an IF input terminal, a double balanced mixer with two signal inputs and an output,
a delay device presenting a delay corresponding to about 50% of a period of said chip rate, means connecting said IF input terminal to an input of said delay device and connecting said input terminal to one signal input of said double balanced mixer, means connecting an output of said delay device to another signal input of said double balanced mixer,
a notch filter with a notch at a frequency corresponding to said chip rate $f_c$,
a low pass filter,
means connecting said output of said double balanced mixer to an input of said notch filter and means connecting an output of said notch filter to an input of said low pass filter.

BRIEF DESCRIPTION OF THE DRAWINGS

The invention will now be further described in connection with the following portions of this application when taken in conjunction with the attached drawings in which:

FIG. 7 represents an embodiment of a receiver in accordance with the present invention which can cooperat with the transmitter embodiment of FIG. 5;

FIG. 8 is a schematic of another embodiment of a receiver which can cooperate with the transmitter embodiment of either FIG. 5 or FIG. 6;

FIG. 9 is a schematic of a transmitter embodiment of the invention which has actually been constructed.

DETAILED DESCRIPTION OF PREFERRED EMBODIMENTS

Figure 1:
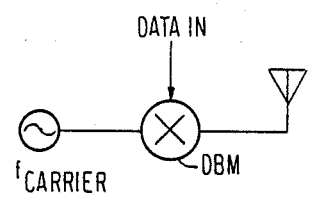
FIG. 1 represents a prior art BPSK transmitter and FIG. 2 represents a prior art BPSK receiver.
Figure 2:
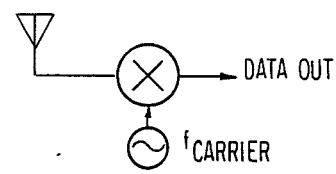
Figure 3:
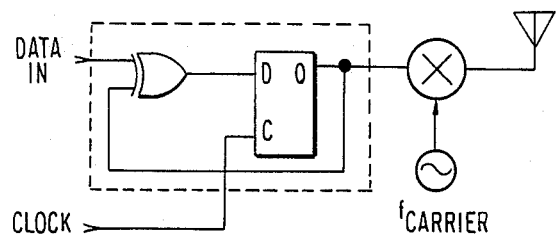
FIG. 3 represents a prior art DE-BPSK transmitter and FIG. 4 represents a prior art DE-BPSK receiver.
Figure 4:
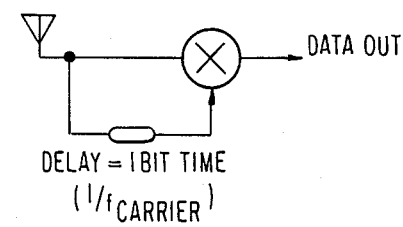
Figure 5:
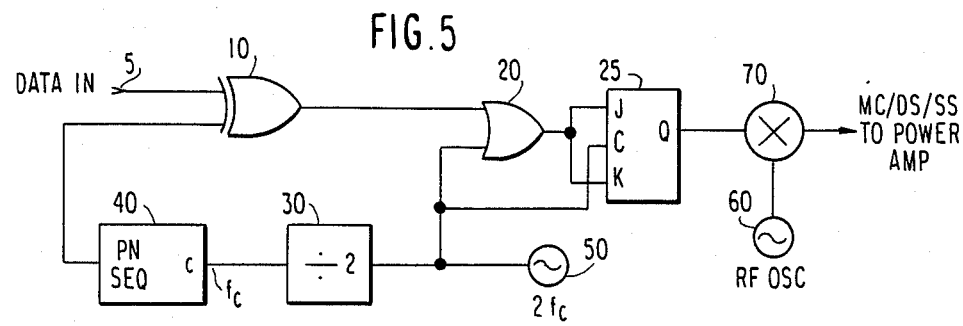
FIG. 5 is a schematic of a Manchester encoded embodiment of the present invention.
Figure 6:
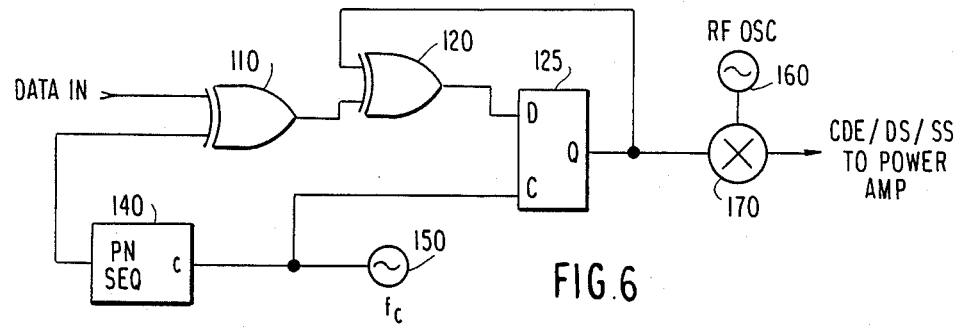
FIG. 6 is an embodiment of a differentially encoded transmitter in accordance with the present invention.

FIGS. 5 and 6 show two different embodiments of spread spectrum type transmitters. The transmitter of FIG. 5 produces Manchester Coded Direct Sequence Spread Spectrum, or MC/DS/SS. On the other hand, the transmitter of FIG. 6 produces Chip-Differential Encoded Direct Sequence Spread Spectrum, or CDE/DS/SS.

Referring to FIG. 5, digital data input is provided from a terminal 5 as one input to an exclusive OR gate 10. The other input to the exclusive OR gate 10 is provided by the output of a pn sequence generator 40 which is clocked at the chip rate $f_c$. The chip rate clock is available from the output of a divide by two divider 30 which is driven from an oscillator 50 operating at twice the chip rate, e.g. $2f_c$. The output of the exclusive OR gate 10 is applied as one input to an OR gate 20. The other input to the OR gate 20 is the output of the oscillator 50. The output of the OR gate is provided as the J and K inputs of a flip-flop 25 which is clocked by the output of the oscillator 50. The Q output of the flip-flop 25 is provided as one input to a double balanced modulator 70, whose carrier input is provided by the output of RF oscillator 60.

While FIG. 5 shows an exclusive OR gate 10, this is merely one device for obtaining a logical product between a digital data stream from the terminal 5 and the output of the pn sequence generator 40. Any other device for producing the logical product could be used in lieu of the exclusive OR gate 10. Those skilled in the art will recognize, in the OR gate 20 and flip-flop 25, a conventional Manchester encoder. Thus FIG. 5 differs from the conventional DS/SS transmitter by the presence of the Manchester encoder. While Manchester encoding is an important part of the embodiment of FIG. 5, it is not essential to use the OR gate 20 and flip-flip 25, but instead any conventional Manchester encoder can be used in lieu of the OR gate 20 and flip-flop 25.

In connection with FIG. 6 the data input terminal 5 provides one input to an exclusive OR gate 110, the other input to which is provided by the output of the pn sequence generator 140. The pn sequence generator 140 is clocked at a chip rate $f_c$ by the chip rate clock or oscillator 150. The output of the exclusive OR gate 110 provides one input to an exclusive OR gate 120. The output of the exclusive OR gate 120 provides the D input to the flip-flop 125 which is clocked at the chip rate $f_c$ from the clock 150. The Q output of the flip-flop 125 provides the other inpyt to th exclusive OR gate 120 and the signal input to the double balanced modulator 170. The carrier input to the double balanced modulator 170 is provided by RF oscillator 160. The output of the double balanced modulator 170 is the Chip Differential Encoded Direct Sequence Spread Spectrum (CDE/DS/SS) output signal which can be transmitted via a conventional power amplifier and antenna. As was the case with the transmitter of FIG. 5 the exclusive OR gate 110 can be replaced by any device to produce the logical combination or product of the input data from terminal 5 and the output of the pn sequence generator 140. In a similar fashion to the embodiment of FIG. 5 the exclusive OR gate 120 and flip-flop 125 perform a differential encoding process and these elements can be replaced by any conventional elements providing for differential encoding.

FIG. 7 shows a first embodiment of a receiver in accordance with the invention. FIG. 7 shows that portion of the receiver in the IF region (the RF reception and down conversion to IF has been omitted from FIG. 7). More particularly, and as is shown in FIG. 7, an IF input is provided to the signal input of a double balanced demodulator 210 and the same signal is provided to the input of a delay line 220. The delay line 220 is designed to provide a delay $1/2f_c$ corresponding to one-half the chip width. Typically the chip width is many times smaller than the bit time (corresponding to the desired multiplication effect of the spreading chracteristic of a spread spectrum system). Thus for example whereas Kavehrad's bit time is 12.7 microseconds, in an embodiment of the invention which has actually been constructed the chip width is 330 nanoseconds. Kavehrad's design requires a 12.7 microsecond delay line which at IF frequencies can only be implemented using expensive SAW devices. On the other hand, even at IF frequencies a 330 nanosecond delay can be provided by a coaxial delay line. In any event the output of delay element 220 is provided as the other input to the double balanced demodulator 210. The output of the double balanced demodulator 210 is provided as an input to a notch filter having a notch frequency corresponding to the chip rate, i.e. $f_c$. The output of the notch filter 230 is provided as an input to a low pass filter 240 having a cut off frequency of $f_c/2$. The output of the low pass filter 240 is a baseband signal consisting of the product of the original input data and the pn sequence. This can be provided to a correlator for detection of the original data input as is conventional. The receiver embodiment shown in FIG. 7 can cooperate with the MC/DS/SS transmitter of FIG. 5.

A different receiver, the schematic of FIG. 8, on the other hand, is usuable with either the MC/DS/SS transmitter embodiment of FIG. 5 or the CDE/DS/SS transmitter embodiment of FIG. 6. FIG. 8 is drawn in a manner similar to FIG. 7 in that it focuses on the IF operations and conversion from IF to baseband and omits the RF frequency conversion to IF and the correlation function which is also necessarily performed at baseband. More particularly, and as shown in FIG. 8, the receiver includes a double balanced demodulator 310 with an IF input signal. The same IF input signal is provided to the delay element 320. In the case of FIG. 8 the delay element 320 provides a delay corresponding to the chip width, i.e. $1/f_c$. As was the case with the embodiment of FIG. 7, for reasonable chip widths, i.e. on the order of less than 500 nanoseconds, this can be implemented as a coaxial delay line and it does not require SAW technology. The output of the delay element 320 is provided as the other input to the double balanced demodulator 310. The output is input to a low pass filter of cut off frequency $f_c/2$. The output of the low pass filter is provided as an input to a correlation stage (not illustrated).

FIG. 9 is a block diagram of a MC/DS/SS transmitter that has been built. Those skilled in the art will readily recognize the correspondence between the block diagram of FIG. 5 and the block diagram of FIG. 9. In the block diagram of FIG. 9, the flip-flop 412 ensures that state changes occur at chip clock intervals. The a.c. coupling capacitor 415 blocks any d.c. component.

Figure 10:
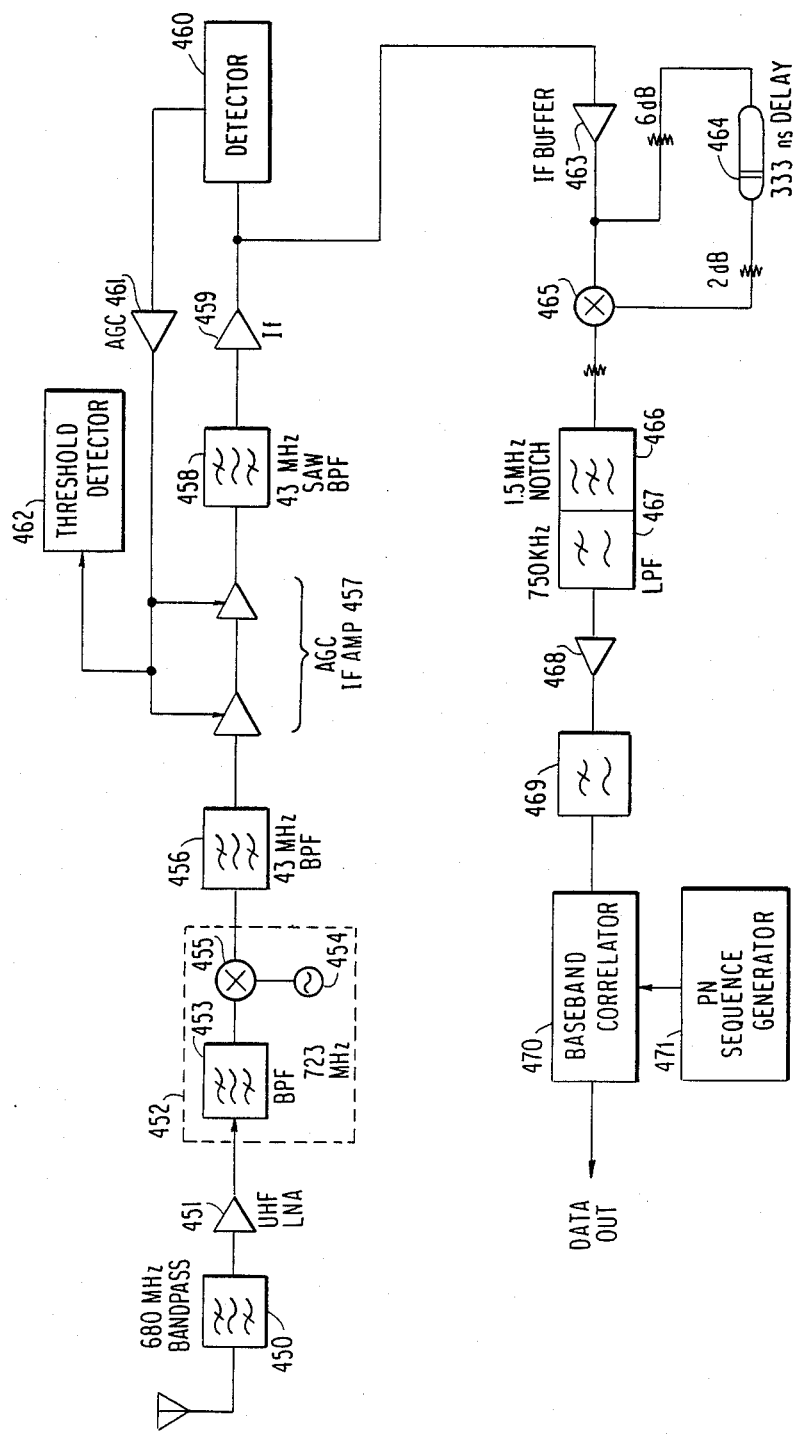
FIG. 10 is a schematic of a receiver embodiment of the present invention which has actually been constructed.

FIG. 10 is a block diagram of a receiver, built along the lines of the block diagram of FIG. 7, for receiving the MC/DS/SS signal generated by the transmitter of FIG. 9. Those skilled in the art will readily recognize, in the block diagram of FIG. 10, those components corresponding to the elements of FIG. 7. FIG. 10 shows, in addition to the RF receiver components (which are omitted from FIGS. 7 and 8), the IF processing and, subsequent to the filter 469, the baseband correlator 470 with an output corresponding to the data input to the transmitter of FIG. 9.

I claim:

1. A spread spectrum communication system resistant to multi-path due to differential delays equal to or less than a chip width comprising:
   a transmitter including:
   a digital data input,
   p-n generator means for generating a p-n signal sequence at a first clock rate, said first clock rate defining said chip width,
   means for logically combining said p-n signal sequence with a signal available at said digital data input,
   an encoder with an input and an output, said encoder input coupled to an output of said means for logically combining,
   a modulator with an oscillator input, a signal input and an output,
   means coupling said encoder output to said signal input of said modulator,
   an oscillator coupled to said oscillator input of said modulator,
   means for transmitting a signal produced at said output of said modulator, and
   a receiver responsive to said transmitted signal, said receiver including:
   an IF demodulator with a two input mixer, one said input fed with an IF signal and another fed by said IF signal delayed by a delay determined relative to said first clock rate, and,
   a low pass filter with a cutoff frequency at about one half said clock rate driven from said mixer, an output of said low pass filter comprising a baseband signal corresponding to ann output of said means for logically combining.

2. A spread spectrum communication system resistant to multi-path due to differential delays equal to or less than a chip width comprising:

a transmitter including:
a digital data input,
p-n generator means for generating a p-n signal sequence at a first clock rate, said first clock rate defining such chip width,
means for logically combining said p-n signal sequence with a signal available at said digital data input,
a Manchester encoder with an input and an output, said Manchester encoder input coupled to an output of said means for logically combining,
a modulator with an oscillator input, a signal input and an output,
means coupling said Manchester encoder output to said signal input of said modulator,
an oscillator coupled to said oscillator input of said modulator,
means for transmitting a signal produced at said output of said modulator, and
a receiver responsive to said transmitted signal, said receiver including:
an IF demodulator with a two input mixer, one said input fed with an IF signal and another fed by said IF signal delayed by a predetermined delay, and,
a notch filter with a center frequency at about said clock rate driven by said mixer, an output of said notch filter coupled to a low pass filter with cutoff frequency at about one half said clock rate, an output of said low pass filter comprising a baseband signal corresponding to an output of said means for logically combining.

3. A system as recited in claim 2 wherein said predetermined delay is determined as a function of said first clock rate.

4. A transmitter for a spread spectrum communication system resistant to multi-path due to delays equal to or less than a chip width comprising:

a digital data input,
p-n generator means for generating a p-n signal sequence at a first clock rate, said first clock rate defining said chip width,
means for logically combining said p-n signal sequence with a signal available at said digital data input,
a Manchester encoder with an input and an output, said Manchester encoder input coupled to an output of said means for logically combining,
a modulator with an oscillator input, a signal input and an output,
means coupling said Manchester encoder output to said signal input of said modulator,
an oscillator coupled to said oscillator input of said modulator,
means for transmitting a signal produced at said output of said modulator.

5. A transmitter for a spread spectrum communication system resistant to multi-path due to differential delays equal to or less than a chip width comprising:

a digital data input,
p-n generator means for generating a p-n signal sequence at a first clock rate, said first clock rate defining said chip width,
means for logically combining said p-n signal sequence with a signal available at said digital data input,
a differential encoder with an input and an output, said differential encoder input coupled to an output of said means for logically combining,
a modulator with an oscillator input, a signal input and an output,
means coupling said differential encoder output to said signal input of said modulator,
an oscillator coupled to said oscillator input of said modulator,
means for transmitting a signal produced at said output of said modulator.

6. A spread spectrum differential demodulator for a Manchester coded direct sequence spread spectrum signal of chip rate $f_c$, said receiver comprising:

an IF input terminal, a double balanced mixer with two signal inputs and an output,
a delay device presenting a delay corresponding to about 50% of a period of said chip rate, means connecting said IF input terminal to an input of said delay device and connecting said input terminal to one signal input of said double balanced mixer, means connecting an output of said delay device to another signal input of said double balanced mixer,
a notch filter with a notch at a frequency corresponding to said chip rate $f_c$,
a low pass filter,
means connecting said output of said double balanced mixer to an input of said notch filter and means connecting an output of said notch filter to an input of said low pass filter.

7. A spread spectrum receiver as received in claim 6 wherein said low pass filter has a cutoff frequency at a frequency corresponding to about half said chip rate.

* * * * *